United States Patent [19]

Ikushima et al.

[11] Patent Number: 4,909,896

[45] Date of Patent: Mar. 20, 1990

[54] PROCESS FOR PRODUCING CONTACT LENS

[75] Inventors: Akira Ikushima, Kawasaki; Takeyuki Sawamoto, Tokyo, both of Japan

[73] Assignee: Hoya Corporation, Shinjuku, Tokyo, Japan

[21] Appl. No.: 315,616

[22] Filed: Feb. 27, 1989

[30] Foreign Application Priority Data

Feb. 29, 1988 [JP] Japan .................................. 63-47199

[51] Int. Cl.⁴ ....................... B44C 1/22; B29C 37/00; C03C 15/00; C03C 25/06
[52] U.S. Cl. .................................. 156/644; 156/628; 156/643; 156/645; 156/654; 156/668; 250/492.1; 351/160 H

[58] Field of Search ............... 156/628, 643, 644, 645, 156/654, 655, 668; 250/492.1, 492.3; 351/160 R, 160 H, 161, 162; 623/4, 6

[56] References Cited

U.S. PATENT DOCUMENTS

| | | | |
|---|---|---|---|
| 3,612,871 | 10/1971 | Crawford | 156/644 X |
| 3,833,786 | 9/1974 | Brucker | 351/160 R |
| 4,621,912 | 11/1986 | Meyer | 351/160 R |

*Primary Examiner*—William A. Powell
*Attorney, Agent, or Firm*—Nixon & Vanderhye

[57] ABSTRACT

The contact lens of the present invention is produced by a process comprising a step of irradiating a transparent polymeric material with charged particles and a step of applying an etching treatment to the resulting material to form microfine holes therein along the tracks of the charged particles.

7 Claims, No Drawings

PROCESS FOR PRODUCING CONTACT LENS

BACKGROUND OF THE INVENTION (1) Field of the Invention

The present invention relates to a process for producing a novel contact lens having a number of microfine through-holes which do not impair the basic properties and functions of contact lens and accordingly exhibiting very high oxygen permeability.

(2) Description of the Prior Art

Contact lenses, as well as conventional spectacles, are in wide use as a means for eyesight correction.

Contact lenses are used on the cornea in direct contact therewith. Therefore, they are required to not only have sufficient optical properties for eyesight correction and good physical and chemical stabilities but also to provide good feeling when worn and enable long continuous wear.

Since the cornea with which a contact lens is in direct contact is an avascular tissue, the cornea tissue, particularly its epithelial tissue takes in oxygen (necessary for the metabolism) from the air via lacrima. Accordingly, in order for a contact lens to provide good feeling when worn and enable long continuous wear, the contact lens must satisfy a requirement that a sufficient amount of oxygen be supplied to the cornea tissue even when the lens is worn. Hence, a contact lens giving better feeling when worn and enabling long continuous wear has been studied through an approach of developing a contact lens with improved oxygen permeability.

As the method for obtaining a contact lens with improved oxygen permeability, there are (a) a method wherein an improved material for contact lens is used (for example, an oxygen-permeable substance is used as a material for contact lens, or, a highly water-absorptive polymer is used as a material for contact lens to allow the material to indirectly have higher oxygen permeability) and (b) a method wherein through-holes are formed in a contact lens to allow the contact lens to have higher oxygen permeability. The latter method (b) can provide a contact lens of higher oxygen permeability irrespective of the type of material used, as compared with a contact lens using the same material but having no through-holes (see, for example, Journal of Japanese Contact Lens Association 25, pp. 191–200, 1983), and therefore is drawing attention.

The method for forming through-holes in a contact lens includes a mechanical holing method and a method wherein a monomer or monomers are polymerized in a vessel containing a fibrous substance aligned in one direction and, after molding the resulting polymer into a contact lens, the fibrous substance contained in the polymer is removed [for example, Japanese Patent Application Kokai (Laid-Open) Nos. 161436/1981 and 48022/1983].

When through-holes are formed according to these conventional methods, however, the sizes of through-holes are usually as large as several hundred microns or more and their number is as small as about several to 10; accordingly, the effect of oxygen permeability improvement by through-holes formation is insufficient. Thus, the through-holes formation by the conventional methods have been unable to fully satisfy the better feeling when worn and the longer continuous wear both of which are current requirements for contact lenses. Further, the large through-holes formed by the conventional methods significantly reduce the optical and mechanical properties originally possessed by contact lens materials, making it difficult to obtain a practical contact lens.

Hence, in order to obtain a contact lens which has excellent oxygen permeability and yet can be used practically, it is necessary to significantly improve oxygen permeability by through-holes formation and further to prevent the reduction in optical and mechanical properties caused by the conventional through-holes formation methods.

SUMMARY OF THE INVENTION

Therefore, an object of the present invention is to provide a process for producing a contact lens, which enables the production of a contact lens having microfine through-holes and resultantly very high oxygen permeability, yet retaining the optical and mechanical properties originally possessed by the contact lens material and accordingly being usable practically.

Other objects of the present invention will be apparent form the following description.

The process for producing a contact lens with microfine through-holes according to the present invention comprises a step of irradiating a contact lens or contact lens material with charged particles and a step of applying an etching treatment to the resulting contact lens or contact lens material to form microfine holes therein along the tracks of the charged particles.

The term "microfine through-holes" used in the present specification means through-holes with microfine hole sizes, which holes pass through the contact lens or the contact lens material. Further the term "microfine holes" used in the present specification means not only the microfine through-holes defined above but also holes with microfine hole sizes, which holes penetrate into a sufficient depth of the contact lens material to obtain a contact lens with microfine through-holes from the contact lens material.

DETAILED DESCRIPTION OF THE INVENTION

The contact lens or contact lens material used in the present invention can be any conventional hard contact lenses or any conventional materials therefor, or any conventional soft contact lenses or any conventional materials therefor as long as they have optical and mechanical properties as well as physical and chemical stabilities as required for contact lenses.

Specifically, the following materials (A) to (D) or contact lenses produced therefrom can be used. (A) Polycarbonates synthesized from at least one bisphenols represented by the following structural formula (1) and (2).

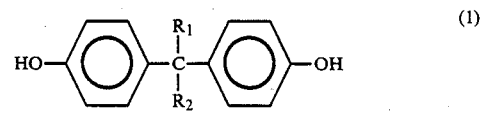

wherein $R_1$ and $R_2$, which may be the same or different, are a substituent selected from the group consisting of H, $CH_3$, $C_2H_5$, $C_3H_7$, $C_4H_9$ and $C_6H_5$.

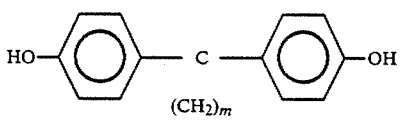

wherein m is 4 or 5.

(B) Polymers composed of diethylene glycol bisallylcarbonate represented by the following structural formula (3).

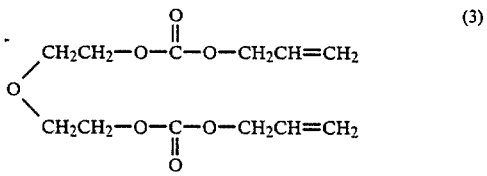

(C) Copolymers composed of diethylene glycol bisallylcarbonate represented by the above structural formula (3) and at least one monomer selected from the following monomers (a) to (d) having at least one carbon-to-carbon unsaturated double bond in the molecule.

(a) (Meth)acrylic acid derivatives. Methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, hexyl (meth)acrylate, cyclohexyl (meth)acrylate, benzyl (meth)acrylate, phenyl (meth)acrylate, trifluoroethyl (meth)acrylate, hexafluoroisopropyl (meth)acrylate, 1,1,2,2-tetrahydrononafluorohexyl (meth)acrylate, 1,1,2,2-tetrahydrotridecafluorooctyl (meth)acrylate, 1,1,2,2-tetrahydroheptadecafluorodecyl (meth)acrylate, trimethylsilylmethyl (meth)acrylate, pentamethyldisiloxyethyl (meth)acrylate, tris(trimethylsiloxy)silylpropyl (meth)acrylate, ethylene glycol di(meth)acrylate, diethylene glycol di(meth)acrylate, triethylene glycol di(meth)acrylate, polyethylene glycol di(meth)acrylate, trimethylolpropane tri(meth)acrylate, hydroxyethyl (meth)acrylate, hydroxypropyl (meth)acrylate, (meth)acrylic acid.

(b) (Meth)acrylamide derivatives. (Meth)acrylamide, N,N-dimethyl(meth)acrylamide, N,N-diethyl(meth)acrylamide.

(c) Styrene derivatives. Styrene, p-methylstyrene, p-trimethylsilylstyrene, p-tert-butylmethylstyrene, perfluorostyrene, divinylbenzene.

(d) N-vinyllactams. N-vinylpyrrolidone, N-vinylpiperidone, N-vinyl-ε-caprolactam.

(D) Cellulose derivatives represented by the following structural formula (4).

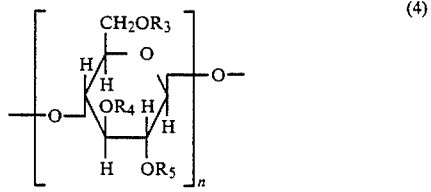

wherein $R_3$, $R_4$ and $R_5$, which may be the same or different, are a substituent selected from the group consisting of H, $CH_3$, $C_2H_5$, $NO_2$, $COCH_3$, $COC_2H_5$ and $COC_3H_7$.

In the present invention, there is firstly effected a step of irradiating the above contact lens material or a contact lens produced therefrom, with charged particles. The charged particles used for irradiation are heavy ions of high energy generated in particle accelerators (e.g. cyclotron) and atomic reactors, and charged particles having a nucleon number of 4 or more are particularly preferable.

The reasons for using such charged particles are that the formability of microfine holes by etching (e.g. rate of hole formation) depends on the mass number of the charged particles irradiated and, in general, the irradiation of charged particles of larger mass number can form desired microfine holes more easily and further that the distance of the tracks of charged particles in contact lens or contact lens material is determined by the energy possessed by the charged particles and accordingly the irradiation of charged particles of high energy can form microfine through-holes even in, for example, a contact lens material of block form.

The energy amount to be imparted to the charged particles to be applied to a contact lens or contact lens material is an amount required for the charged particles to pass through the contact lens or contact lens material or to penetrate into a sufficient depth of the contact lens material to ensure the cutting of the contact lens material to finally obtain the contact lens with microfine through-holes. The energy amount of charged particles is set appropriately depending on the thickness and type of the contact lens or contact lens material to which the charged particles are applied, as well as on the properties to be possessed by a final contact lens product. For example, when a contact lens material having a thickness of 0.20 mm is irradiated with helium ion (charged particles), the helium ion is endowed with an energy of 5-6 MeV per nucleon and thereby the helium ion can pass through the contact lens material.

In the present invention, the contact lens or contact lens material irradiated with charged particles are subjected to a next step, i.e. an etching treatment. This etching treatment is preferably effected by immersing the irradiated contact lens or irradiated contact lens material in an etching solution. The etching solution can be any etching solution, in principle, as long as it can etch said contact lens or contact lens material. The use of an aqueous alkali solution containing strong alkalis such as sodium hydroxide, potassium hydroxide or the like can shorten the etching time.

The concentration of the alkali solution is determined in view of the size of microfine holes formed or the etching time, but ordinarily there is used an alkali solution with the normality of 2 to 30. Ordinarily the etching temperature is selected in a range of room temperature to 130° C. and the etching time is selected in a range of 10 seconds to 30 hours. Effecting the etching particularly at room temperature to 80° C. for 2 minutes to 8 hours is preferable for practical purpose.

In obtaining a contact lens with microfine through-holes according to the present invention, the following three approaches can be taken: (1) irradiating a contact lens obtained by shaping a contact lens material into a desired form, with charged particles and subjecting the resulting contact lens to an etching treatment to form microfine through-holes therein along the tracks of the charged particles, (2) irradiating a contact lens material with charged particles, shaping the resulting contact lens material into a contact lens and subjecting the contact lens to an etching treatment to form microfine through-holes therein along the tracks of the charged particles, and (3) irradiating a contact lens material with charged particles, subjecting the resulting contact lens material to an etching treatment to form microfine holes therein along the tracks of the charged particles, and shaping the contact lens material into a contact lens with microfine through-holes.

In the present process for producing a contact lens with microfine through-holes, the contact lens or contact lens material irradiated with charged particles is endowed with an energy along the tracks of the charged particles; in the energy-imparted portions of the contact lens or contact lens material, there occurs a radiochemical reaction, for example, scission or cleavage of main chain into lower molecular weight; as a result, these portions are etched more easily than the non-irradiated portions.

This makes it possible to subject the contact lens or contact lens material irradiated with charged particles to an etching treatment to form a number of microfine holes therein along the tracks of the charged particles. The sizes of the thus formed microfine holes are small (e.g. 10 $\mu$m or less) and relatively uniform compared with those obtained by the conventional method; consequently, the final contact lens product with microfine through-holes retains the optical and mechanical properties originally possessed by the contact lens or contact lens material before irradiation of charged particles.

Thus, the process according to present invention enables the production of a contact lens which has a number of microfine through-holes and accordingly very high oxygen permeability, yet retains the optical and mechanical properties originally possessed by the contact lens or contact lens material before irradiation of charged particles, and therefore is usable practically.

The thus obtained contact lens has a number of microfine through-holes, the sizes of which are small and relatively uniform compared with those obtained by the conventional method; consequently it has extremely high oxygen permeability and retains the optical and mechanical properties originally possessed by the contact lens or contact lens material.

The present invention is described in more detail below by way of Examples and Comparative Examples.

EXAMPLE 1

A polymerizable mixture consisting of 97% by weight of diethylene glycol bisallylcarbonate as a monomer for transparent polymeric material and 3% by weight of diisopropyl peroxycarbonate as a polymerization initiator was poured into a glass vessel of 15 mm in diameter. The vessel was sealed in a nitrogen atmosphere. The vessel was then placed in a constant temperature bath of hot air circulation type and the polymerizable mixture was subjected to heat treatments of 45° C.×25 hours, 70° C.×15 hours, 100° C.×9 hours and 120° C.×3 hours in this order to obtain a transparent polymeric material. This material was subjected to known mechanical processing to preapre a contact lens of 0.15 mm in thickness.

The contact lens was irradiated with helium ion having an energy of 4 MeV per nucleon given by a particle accelerator, in the thickness direction for 1 minute. The resulting contact lens was subjected to an etching treatment by immersing it in a 5N aqueous sodium hydroxide solution of 80° C. for 3 hours, to obtain a contact lens with microfine through-holes.

In order to evaluate the oxygen permeability of the above contact lens with microfine through-holes, a test sample was produced in the same manner as above, except that it had a flat disc shape, and the test sample was measured for oxygen permeability coefficient using a gas permeability meter (K-315, manufactured by Rika Seiki K.K.). The sample had a very high oxygen permeability coefficient of $4.7 \times 10^{-8}$ cm$^3$ (STP) cm/cm$^2$.sec.cmHg.

The surface of the disc-shaped sample was observed with a SEM (a scanning electron microscope), in which there were found a number of microfine holes of about 7 $\mu$m in size and their sizes were relatively uniform.

The above obtained contact lens with microfine through-holes was also measured for optical and mechanical properties in comparison with the above mentioned contact lens before irradiation of charged particles. There was substantially no difference in optical and mechanical properties between the two.

The contact lens with microfine through-holes was further measured for hydrophilicity by measuring its contact angle against pure water at room temperature using a goniometer type contact angle meter manufactured by Erma K.K. The contact angle was as small as 48° and the contact lens had good hydrophilicty.

COMPARATIVE EXAMPLE 1

The same transparent polymeric material as in Example 1 was subjected to known mechanical processing without being subjected to the irradiation of charged particles and an etching treatment, to obtain a contact lens of 0.15 mm in thickness.

A flat disc sample consisting of the same material as the contact lens obtained above was separately prepared and measured for oxygen permeability in the same manner as in Example 1. It had an oxygen permeability coefficient of $2.3 \times 10^{-10}$ cm$^3$ (STP) cm/cm$^2$.sec.cmHg, which was significantly low as compared with that of the sample of Example 1.

The contact angle measured was 59°, which indicates that the contact lens of this Comparative Example has lower hydrophilicity than the contact lens of Example 1.

EXAMPLE 2

A commercial product of bisphenol A polycarbonate as a transparent polymeric material was subjected to known compression molding to prepare a contact lens of 0.15 mm in thickness.

The contact lens was irradiated with argon ion having an energy of 20 MeV per nucleon given by a particle accelerator, in the thickness direction for 1 minute. The resulting contact lens was subjected to an etching treatment by immersing it in an 8N aqueous sodium hydroxide solution of 70° C. for 1 hour, to obtain a contact lens with microfine through-holes.

A flat disc sample with microfine through-holes consisting of the same material as the contact lens with microfine through-holes obtained above was separately prepared and measured for oxygen permeability in the same manner as in Example 1. The test sample had a very high oxygen permeability coefficient of $5.9 \times 10^{-7}$ cm$^3$ (STP) cm/cm$^2$.sec.cmHg The above obtained contact lens with microfine through-holes was measured for optical and mechanical properties in comparison with the contact lens before irradiation of charged particles. There was substantially no difference in optical and mechanical properties between the two.

The contact lens with microfine through-holes was further measured for hydrophilicity in the same manner as in Example 1. The contact angle was as small as 63° and the contact lens had good hydrophilicity.

EXAMPLES 3-10

Eight contact lenses were prepared from respective transparent polymeric materials, in manners similar to Examples 1 and 2. Each of these contact lenses was subjected to irradiation of charged particles under different conditions such as irradiation of charged particles of different type and different energy and then to etching under different etching conditions, to obtain 8 different contact lenses each with microfine through-holes.

Flat disc samples with microfine through-holes consisting of the same material as the contact lenses with microfine through-holes obtained above were separately prepared and measured for oxygen permeability in the same manner as in Example 1. Each sample had very high oxygen permeability, as shown in Table 1.

Each of the contact lenses with microfine through-holes was measured for optical and mechanical properties in comparison with the corresponding contact lens before irradiation of charged particles. There was substantially no difference in optical and mechanical properties between each two.

Each of the contact lenses with microfine through-holes was further measured for hydrophilicty in the same manner as in Example 1. As shown in Table 1, the contact angle was as small as 48°-68° in all cases and all the lenses had good hydrophilicty.

COMPARATIVE EXAMPLE 2

For comparison with Example 6, a contact lens was prepared in the same manner as in Example 6 except that neither charged particles irradiation nor etching treatment was applied.

A flat disc sample consisting of the same material as the contact lens obtained above was separately prepared and measured for oxygen permeability in the same manner as in Example 1. The test sample gave an oxygen permeability coefficient of $3.4 \times 10^{10}$ cm$^3$ (STP) cm/cm$^2$.sec.cmHg, which was significantly low as compared with that of the sample of Example 6.

The contact angle of 69° measured for the contact lens shows that the contact lens of this Comparative Example has lower hydrophilicity than the contact lens of Example 6.

EXAMPLE 11

A polymerizable mixture consisting of 70% by weight of diethylene glycol bisallylcarbonate, 27% by weight of methyl methacrylate and 3% by weight of diisopropyl peroxycarbonate (a polymerization initiator) was poured into a glass vessel of 15 mm in diameter. The vessel was sealed in a nitrogen atmosphere. The vessel was then placed in a constant temperature bath of hot air circulation type and the polymerizable mixture was subjected to heat treatments of 40° C.×10 hours, 60° C.×8 hours, 80° C.×5 hours and 120° C.×3 hours in this order, to obtain a bulk polymer. A contact lens material of 12 mm in diameter and 5 mm in thickness was cut out from the transparent polymeric material (the bulk polymer).

The contact lens material was irradiated with helium ion having an energy of 20 MeV per nucleon given by a particle accelerator, in the thickness direction for 1 minute. The resulting material was processed into a contact lens according to an ordinary cutting and polishing method. The contact lens was subjected to an etching treatment by immersing it in a 5 N aqueous potassium hydroxide solution of 80° C. for 3 hours to obtain a contact lens with microfine through-holes.

A flat disc sample with microfine through-holes consisting of the contact lens with microfine through-holes obtained above was separately prepared and measured for oxygen permeability in the same manner as in Example 1. The test sample had a very high oxygen permeability coefficient of $3.8 \times 10^{-8}$ cm$^3$ (STP) cm/cm$^2$.sec.cmHg.

The contact lens with microfine through-holes was measured for optical and mechanical properties in comparison with the contact lens before irradiation of charged particles. There was substantially no difference in optical and mechanical properties between the two.

The contact lens with microfine through-holes was further measured for hydrophilicty in the same manner as in Example 1. The contact angle was as small as 53° and the contact lens had good hydrophilicity.

EXAMPLE 12

The contact lens material of 12 mm in diameter and 5 mm in thickness obtained in the same manner as in Example 11 was irradiated with helium ion under the same conditions as in Example 11. The resulting material was subjected to an etching treatment by immersing it in a 5 N aqueous sodium hydroxide solution of 80° C. for 5 hours. The material was then processed into a contact lens with microfine through-holes according to an ordinary cutting and polishing method.

A flat disc sample with microfine through-holes consisting of the same material as the contact lens with microfine through-holes obtained above was separately prepared and measured for oxygen permeability in the same manner as in Example 1. The test sample had a very high oxygen permeability coefficient of $3.2 \times 10^{-8}$ cm$^3$ (STP) cm/cm$^2$.sec.cmHg.

The contact lens with microfine through-holes was measured for optical and mechanical properties in comparison with the contact lens before irradiation of charged particles. There was substantially no difference in optical and mechanical properties between the two.

The contact lens with microfine through-holes was further measured for hydrophilicity in the same manner as in Example 1. The contact angle was as small as 55° and the contact lens had good hydrophilicity.

COMPARATIVE EXAMPLES 3 AND 4

For comparison with Examples 1-12, two contact lenses of 0.15 mm in thickness were prepared by subjecting two transparent polymeric materials each of high oxygen permeability to conventional processing without applying to them neither charged particles irradiation nor etching treatment.

Two flat disc samples consisting of the same material as the two contact lenses obtained above were separately prepared and measured for oxygen permeability in the same manner as in Example 1. They had oxygen permeability coefficients of $1.2 \times 10^{-9}$ cm$^3$ (STP) cm/cm$^2$.sec.cmHg and $8.2 \times 10^{-9}$ cm$^3$ (STP) cm/cm$^2$.sec.cmHg, which were significantly lower than those of the samples with microfine through-holes obtained in Examples 1-12.

Further the contact angles in Comparative Examples 3 and 4 were 80° and 92°, respectively, which shows that the contact lenses of these Comparative Examples have significantly low hydrophilicity compared with those of Examples 1-12.

On each of the contact lenses with microfine through-holes obtained in Examples 1-12 and the contact lenses obtained in Comparative Examples 1-4, there are shown in Table 1 the composition of the transparent polymeric material used as a contact lens material, the type and energy amount of the charged particles irradiated, the type and concentration of the etching solution used, the etching time and temperature, the oxygen permeability coefficient of the test sample, and the contact angle against water.

TABLE 1

| | Transparent polymeric material Composition (wt. %) | Charged particle Type | Acceleration energy Mev/amu | Etching agent | Normality N | Etching temp. °C | Etching time min | Oxygen permeability coefficient*1 cm³ (STP) cm/cm².sec.cmHg | Contact angle against water*2 Degree |
|---|---|---|---|---|---|---|---|---|---|
| Example | | | | | | | | | |
| 1 | DGB/IPP (97/3) | Helium ion | 4 | NaOH | 5 | 80 | 180 | $4.7 \times 10^{-8}$ | 48 |
| 2 | PC-1 (100) | Argon ion | 20 | NaOH | 8 | 70 | 60 | $5.9 \times 10^{-7}$ | 63 |
| 3 | DGB/MMA/IPP (70/27/3) | Argon ion | 20 | KOH | 5 | 80 | 180 | $7.1 \times 10^{-8}$ | 56 |
| 4 | PC-2 (100) | Argon ion | 20 | KOH | 6 | 80 | 150 | $1.1 \times 10^{-7}$ | 65 |
| 5 | DGB/3FMA/3G/IPP (60/30/7/3) | Nitrogen ion | 35 | NaOH | 8 | 80 | 120 | $2.3 \times 10^{-7}$ | 68 |
| 6 | PC-1 (100) | Nitrogen ion | 35 | NaOH | 5 | 80 | 45 | $1.5 \times 10^{-7}$ | 62 |
| 7 | DGB/4G/IPP (50/47/3) | Nitrogen ion | 35 | NaOH | 5 | 80 | 180 | $2.2 \times 10^{-6}$ | 49 |
| 8 | DGB (100) | Helium ion | 4 | NaOH | 5 | 60 | 300 | $6.9 \times 10^{-7}$ | 53 |
| 9 | PC-1 (100) | Argon ion | 20 | NaOH | 7 | 70 | 130 | $2.3 \times 10^{-7}$ | 48 |
| 10 | DGB/MMA/IPP (70/27/3) | Chlorine ion | 30 | NaOH | 5 | 60 | 120 | $6.9 \times 10^{-7}$ | 63 |
| 11 | PC-1 (100) | Helium ion | 20 | KOH | 5 | 80 | 180 | $3.8 \times 10^{-8}$ | 53 |
| 12 | DGB/MMA/IPP (70/27/3) | Helium ion | 20 | NaOH | 5 | 80 | 300 | $3.2 \times 10^{-8}$ | 55 |
| Comparative Example | | | | | | | | | |
| 1 | DGB/IPP (97/3) | | | | | | | $2.3 \times 10^{-10}$ | 59 |
| 2 | PC-1 (100) | | | | | | | $3.4 \times 10^{-10}$ | 69 |
| 3 | 6FMA/MMA/3G (50/45/5) | | | | | | | $1.2 \times 10^{-9}$ | 80 |
| 4 | SiMA/3FMA/EDMA (74/20/6) | | | | | | | $8.2 \times 10^{-9}$ | 92 |

IPP: Diisopropyl peroxydicarbonate
DGB: Diethylene glycol bisallylcarbonate
PC-1: Bisphenol A polycarbonate

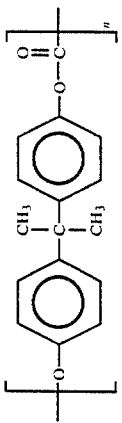

MMA: Methyl methacrylate
PC-2: Bisphenol F polycarbonate

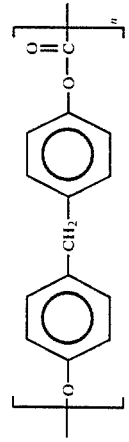

3FMA: Trifluoroethyl methacrylate
3G: Triethylene glycol dimethacrylate
NC: Nitrocellulose
4G: Tetraethylene glycol dimethacrylate
6FMA: Hexafluoroisopropyl methacrylate
SiMA: Tris(trimethylsiloxy)silylpropyl methacrylate
EDMA: Ethylene glycol dimethacrylate
*1: Oxygen permeability coefficient at 35° C. as measured by K-315, a gas permeability meter manufactured by Rika Seiki Kogyo K.K. The unit is cm³ (STP) cm/cm².sec.cmHg.
*2: Contact angle at room temperature as measured by a contact angle meter of goniometer type manufactured by Erma K.K.

As described above, the present invention enables the production of a contact lens which has very high oxygen permeability, retains the optical and mechanical properties originally possessed by the contact lens material and accordingly is usable practically.

Therefore, by practicing the present invention, there can be obtained a contact lens giving better feeling when worn and longer continuous wear.

What is claimed is:

1. A process for producing a contact lens with microfine through-holes, which comprises a step of irradiating a contact lens or contact lens material with charged particles and a step of applying an etching treatment to the resulting contact lens or contact lens material to form microfine holes therein along the tracks of the charged particles.

2. A process for producing a contact lens with microfine through-holes according to claim 1, which comprises irradiating a contact lens with charged particles and applying an etching treatment to the resulting contact lens to form microfine through-holes along the tracks of the charged particles.

3. A process for producing a contact lens with microfine through-holes according to claim 1, which comprises irradiating a contact lens material with charged particles, shaping the resulting contact lens material into a contact lens, and applying an etching treatment to the contact lens to form microfine through-holes therein along the tracks of the charged particles.

4. A process for producing a contact lens with microfine through-holes according to claim 1, which comprises irradiating a contact lens material with charged particles, applying an etching treatment to the resulting contact lens material to form microfine holes therein along the tracks of the charged particles, and shaping the contact lens material with microfine holes into a contact lens with microfine through-holes.

5. A process for producing a contact lens with microfine through-holes according to any of claims 1, wherein the number of nucleons in each charged particle is 4 or more.

6. A process for producing a contact lens with microfine through-holes according to claims 1, wherein the etching treatment is effected by a wet etching method using an aqueous alkali solution as an etching solution.

7. A process for producing a contact lens with microfine through-holes according to claims 1, wherein the etching treatment is effected at a temperature of room temperature to 130° C.

* * * * *